Patented May 5, 1953

2,637,708

UNITED STATES PATENT OFFICE 2,637,708

PROCESS FOR PENTAERYTHRITOL-DE-GUMMED SOYBEAN OIL-MODIFIED ALKYD RESINS

Paul E. Marling and August R. Hempel, Dayton, Ohio, assignors to Monsanto Chemical Company, St. Louis, Mo., a corporation of Delaware No Drawing. Application March 27, 1950, Serial No. 152,276

7 Claims. (Cl. 260—22)

This invention relates to a process for the production of oil-modified pentaerythritol type alkyd resins, wherein degummed soybean oil is employed in place of the conventional alkali-refined soybean oil.

The alkyd resin art is very voluminous and the industry is keenly competitive. Hence, any improvements in characteristics or economics of the alkyd resin products are extremely advantageous. Therefore, attempts have been made to replace alkali-refined soybean oil with the cheaper degummed soybean oil. It was found that when the normal procedures of the prior art were employed, wherein oil-soluble alcoholysis catalysts, as for example, calcium naphthenate and zinc naphthenate were used in the conventional manner, alcoholysis was not accomplished in a reasonable processing time, but ultimately when alcoholysis was attained the resultant alkyd resin products contained a large quantity of a flocculent suspension which was extremely difficult or impossible to filter. This problem appears to be unique with pentaerythritol type alkyds since glycerol type alkyds do not exhibit this phenomenon.

The formation of this gelatinous precipitate is not fully understood, but it appears certain that it is related to the extraneous matter found in a degummed or clarified soybean oil. The break of crude soybean oil contains phosphatides, pigments, proteins or protein fragments, and mucilaginous materials and varying amounts of these materials are retained in the degummed oil. The principal detrimental material is believed to be the phosphatides which are glycerophosphoric acid esters, as for example, lecithin and cephalin.

The degummed or clarified soybean oil has a substantial portion of the break eliminated by treatment with water, wherein the water and crude oil are brought into intimate contact by emulsifying them together and then holding them for a suitable time to effect hydration of the break material components causing their precipitation and enabling their removal by centrifugation or other suitable methods. Accordingly, "degummed soybean oil" can be defined as raw or crude soybean oil from which only a portion of the break material components have been removed. Crude oil from the mechanical processes, as for example, expeller, screw press and hydraulic press, contain larger amounts of break materials than solvent-extracted oils and generally require a degumming treatment before being applicable to utilization in the process of this invention. Several of the solvent-extraction processes entail steaming of the oil to effect efficient solvent recovery which treatment simultaneously causes a reduction of the break materials and provides an oil which may be directly used in this invention.

For most purposes the degummed soybean oil requires additional refining to further reduce the extraneous components of the oil. A large portion of the commercial soybean oil is alkali-refined, wherein the oil is heated with an excess of caustic soda sufficient to neutralize the free fatty acid, remove the break and reduce the color. The oil is then allowed to separate and the oil phase well washed with water to provide an ash-free product. Then the oil is vacuum dried in a spray chamber to effect rapid removal of the moisture to prevent hydrolysis of the oil. Obviously, the additional processing of an alkali-refined soybean oil is reflected in its selling price which may range from about 8 to 12 per cent greater than a clarified oil.

It is the principal object of this invention to provide a process for the production of oil-modified pentaerythritol type alkyd resins utilizing degummed soybean oil. Another object is to enable the production of degummed soybean oil-modified alkyd resins without poisoning the alcoholysis catalyst. Other objects will be apparent to those skilled in the art.

It has now been found that a pre-treatment of degummed soybean oil with pentearythritol for at least about 10 minutes at above about 450° F. enables the further processing of the degummed soybean oil in the conventional manner with a normal alcoholysis time and a reduction of the gelatinous precipitate enabling the ready filtration of the product. When pure mono pentaerythritol is employed, a clear alkyd resin is directly obtained.

It is believed that the short pre-treatment of the degummed soybean oil with pentaerythritol causes an esterification of the phosphatides present in the degummed oil thereby solubilizing the phosphatides in the alkyd resin product and eliminating or reducing precipitation. This procedure also eliminates the potential point of reaction of the oil-soluble metallic alcoholysis catalyst, wherein, for example, the calcium salts of the phosphatides are presumed to be formed; thus, the catalyst is not destroyed and alcoholysis proceeds in a normal manner.

It is possible to remove the phosphatides by incorporating sufficient catalyst to neutralize same and then adding the desired excess of catalyst for alcoholysis. This procedure is, however, uneconomical and impractical, since a relatively large amount of catalyst may be required and the resultant product would contain a difficultly filterable precipitate. Further the stoichiometric relationship of the metallic element component of the soluble alcoholysis catalyst to the degummed oil is not entirely predictable, thus it would be difficult to obtain a uniform product since the effective catalyst could vary over a wide range. The film characteristics of the final alkyd resin may thus be inferior in color, water and alkali resistance, etc.

The following examples are illustrative of the invention:

*Example 1*

A closed reaction vessel was adapted to exclude oxygen from the system by providing a positive pressure flow of carbon dioxide during the reaction. The vessel was also equipped to provide rapid agitation.

A 137.5-g. sample of regummed soybean oil was charged into the reaction vessel, the flow of carbon dioxide initiated and the oil heated to 480° F. Then 13.8 g. of pentaerythritol (technical) was added and heating continued for about 17 minutes at which time 0.57 g. of a calcium naphthenate solution containing 5 per cent calcium was added. After 22 minutes at about 475° F. an additional 15.0 g. of pentaerythritol was introduced and alcoholysis continued for 21 minutes at which time the methyl alcohol test indicated a solubility of 4 parts of alcohol per part of product at the boiling point of this mixture. Then 51.9 of phthalic anhydride and 1.06 g. of maleic anhydride were added and a temperature of 450° F. maintained during esterification. Ten minutes after the temperature reached 450° F. 0.75 ml. of triphenyl phosphite was added. After a total time of esterification of about 3 hours, the alkyd resin had an acid value of 8, a Gardner-Holdt viscosity of U when made up as a 70 alkyd–30 mineral spirits formulation and the product was slightly hazy but was easily filtered to a clear product.

*Example 2*

A 134.8-g. sample of degummed soybean oil was added to the reaction vessel of Example 1, the flow of carbon dioxide initiated, and the oil heated to 480° F. Then 27.2 g. of pentaerythritol (technical) was added thereto. After 15 minutes, 0.66 g. of a calcium naphthenate solution containing 5 per cent calcium was added and alcoholysis of the oil was discontinued after 32 minutes at 480° F., at which time the methyl alcohol solubility was 4 parts of alcohol per part of the product at the boiling point of this mixture. Then 53 g. of phthalic anhydride and 1.2 g. of maleic anhydride were added and a temperature of 450° F. maintained during esterification. About 11 minutes after the temperature reached 450° F., 0.71 ml. of triphenyl phosphite was added. The total time of esterification was about 3.5 hours. The alkyd resin product had an acid value of 8 and a Gardner-Holdt viscosity of R when made up as a 70 alkyd–30 mineral spirits formulation. The resin was easily filtered to a clear product.

*Example 3*

A similar experiment to Example 1 was run but the degummed soybean oil, pentaerythritol and calcium naphthenate were reacted together rather than first interacting the degummed soybean oil and pentaerythritol.

A 137.5-g. sample of degummed soybean oil was added to the reaction vessel of Example 1, the flow of carbon dioxide initiated, and the oil heated to 480° F. The calcium naphthenate catalyst (0.57 g.) and pentaerythritol (13.8 g.) were added and heating continued at about 475 to 480° F. for about an hour, at which time the reaction mixture was still cloudy, indicating that no appreciable alcoholysis had taken place.

As shown in Examples 1 and 2 above the pentaerythritol can be added stepwise or all at once. When only a portion of the total pentaerythritol is added and reacted with the degummed soybean oil prior to the addition of the catalyst, it is preferred that about 10 per cent by weight based on the oil be employed, then after the addition of the catalyst and after the alcoholysis has progressed for a short time the balance of the pentaerythritol can be added in one or more steps. It is generally preferable to employ the stepwise addition process as indicated above in order to provide alkyd resin products of light color, particularly when medium and short oil-modified alkyd resins are produced.

When pure mono pentaerythritol was employed a clear resin was directly obtained as described and claimed in the copending application of Paul E. Marling and August R. Hempel, Serial No. 152,011, filed March 25, 1950.

The catalyst concentration preferably employed, expressed as the metallic element component, is from about 0.01 to about 0.05 per cent by weight of the oil, but larger amounts may be employed. The alcoholysis temperature is preferably maintained at from about 450° F. to about 525° F., and preferably the alcoholysis product should show a solubility of at least 2.5 parts by volume of methyl alcohol per part by volume of product at room temperature before the addition of the dicarboxylic acid anhydride.

The dicarboxylic acid anhydride should be selected from the group consisting of phthalic anhydride and a mixture of phthalic anhydride and maleic anhydride, wherein the latter does not exceed 5 per cent and preferably does not exceed 2.5 per cent by weight of the former. The esterification temperature is preferably maintained at from about 440 to about 525° F. for a sufficient time to reduce the acid value to below about 15.

The invention herein disclosed is applicable to the entire range of oil-modified alkyds, the above specific examples demonstrating the utility with a long oil-modified alkyd. The general range of degummed soybean oil which can be employed is from about 30 to about 75 per cent by weight of the total resin ingredients.

Preferably the alkyd resin should be treated with from about 0.2 to about 2.0 per cent, by weight of the alkyd resin, of a phosphorus compound, as for example, triphenyl phosphite and orthophosphoric acid to improve the resin color and avoid any opacity caused by the presence of a dicalcium salt of the dicarboxylic acid anhydrides. This material is generally added about 10 to 30 minutes after the esterification reaction temperature reaches about 440° F.

It is understood that the alkyd resin may be formulated in the usual manner, as for example, with solvent, pigments, fillers, and driers.

We claim:

1. In the process of producing a degummed soybean oil-modified alkyd resin the step consisting of the reaction of pentaerythritol and degummed soybean oil at a temperature above about 450° F. for at least about 10 minutes prior to the introduction of the oil-soluble alcoholysis catalyst, then adding the said catalyst and continuing the alcoholysis until a clear solubility at room temperature of at least 2.5 parts by volume of methyl alcohol per part by volume of product is obtained, then esterifying the resulting product by adding a dicarboxylic acid anhydride until the acid value is reduced below about 15.

2. The process of producing a degummed soybean oil-modified alkyd resin comprising the reaction of pentaerythritol and degummed soybean oil at a temperature above about 450° F. for at least about 10 minutes then adding from 0.01 to about 0.05 per cent, expressed as the metallic element component, oil-soluble alcoholysis catalyst, based on the weight of oil employed, and continuing the alcoholysis until a clear solubility at room temperature of at least 2.5 parts by volume of methyl alcohol per part by volume of product is obtained, the temperature for alcoholysis being maintained at from about 450 to about 525° F., then esterifying the resulting product by adding a dicarboxylic acid anhydride selected from the group consisting of phthalic anhydride and a mixture of phthalic anhydride and maleic anhydride wherein the latter does not exceed 5 per cent by weight of the former and heating at from about 440 to about 525° F. until the acid value is reduced below about 15.

3. The process of claim 2 wherein the catalyst is calcium naphthenate.

4. The process of claim 2 wherein the catalyst is zinc naphthenate.

5. The process of claim 2 wherein from about 30 to about 75 per cent, by weight of the total resin ingredients, is degummed soybean oil.

6. The process of claim 2 wherein from about 0.2 to about 2.0 per cent, by weight of the alkyd resin, of a phosphorus compound from the group consisting of triphenyl phosphite and orthophosphoric acid is added to the reaction mixture at about 10 to 30 minutes after the esterification reaction temperature reaches about 440° F.

7. The process of claim 2 wherein about 10 per cent pentaerythritol, by weight based on the oil, is reacted with the degummed soybean oil prior to the catalyst introduction and the balance of the pentaerythritol is added thereafter.

PAUL E. MARLING.
AUGUST R. HEMPEL.

References Cited in the file of this patent

UNITED STATES PATENTS

| Number | Name | Date |
|---|---|---|
| 2,370,962 | Hubbuch et al. | Mar. 6, 1945 |
| 2,479,951 | Marling | Aug. 23, 1949 |